June 18, 1963  G. R. ARCHER  3,094,608

SERVO SYSTEM SIGNAL GENERATION

Filed Jan. 21, 1960

INVENTOR.
George R. Archer
BY
ATTORNEY

United States Patent Office 3,094,608
Patented June 18, 1963

3,094,608
SERVO SYSTEM SIGNAL GENERATION
George R. Archer, Salfordville, Pa., assignor, by mesne assignments, to Robotron Corporation, a corporation of Michigan
Filed Jan. 21, 1960, Ser. No. 3,779
6 Claims. (Cl. 219—110)

This invention pertains to methods and circuits for the generation of servo system signals, and more particularly to the generation of error correction signals proportional to the time integral of the difference between a reference signal and a feedback signal.

A servo or closed-loop regulator system acts on a controlled quantity subjected to external disturbances functions to equate a condition of that quantity to a desired reference condition. Typically, a servo system includes: (1) a means supplying a reference signal equivalent to the desired condition that the servo is required to hold; (2) a means supplying a feedback signal equivalent to the actual condition of the controlled quantity; (3) a means generating an error correction signal proportional to a function of error (difference) between the feedback and reference signals; (4) a means actuated by the error correction signal altering the level of the controlled quantity.

In many practical servo system applications, the power input is from an alternating current source and the potential drop (voltage) across a resistance is the signal fed back as directly proportional to some physical or thermal condition. This feedback voltage signal is developed by an electric current traversing a resistive parameter of the controlled quantity. However, the voltage across a resistor varies not only with resistance but also with inductive effects according to the rate of change of current through the distributed inductance which is necessarily a part of any real circuit. These inductive voltage effects must be eliminated before a usable error correction signal can be attained from the feedback signal. Because it is not generally practicable for the reference signal to be an alternating voltage, alternating feedback voltage signals must be rectified before difference error comparison is accomplished. Further, to prevent perpetuity of error due to continuous disturbance, the error correction signal is preferably an integral function of the comparison error.

Because of the undesirable inductive effects, it has been usually necessary to resort to a sampled data system whereby the feedback signal is sampled coincidentally with current maxima, when the rate of change of current through the controlled quantity circuit is nil. The periods of these maxima are infinitesimal, however, and their phase relationship is inconstant.

As a specific example of the generic problems outlined above, reference may be had to the copending application of George R. Archer, Serial No. 756,397, filed August 21, 1958. There is shown therein a resistance heating control system which assures attainment of a desired temperature condition on (e.g. that of weld nugget fusion) by a monitoring and constraint of the voltage developed across a workpiece in a resistance heating circuit. While that system is extremely advantageous, it includes complex and expensive sampling circuits for generation of the error correction signals. With even the most rigorous design precautions, those circuits are still somewhat liable to inaccuracies due to the above-mentioned sampling difficulties.

Therefore, it is a general object of this invention to provide an improved method for generating servo system error correction signals which obviates undesirable inductive voltage effects superimposed upon controlled quantity condition indicating resistive voltages.

Another general object is to provide, for alternating current servo systems, improved signal generator circuits yielding error correction signals which, during the entirety of utilization periods therefor, are an integral function of the difference between a reference signal voltage and a feedback signal resistive voltage component without interference from the feedback signal inductive voltage components.

According to the method of this invention, servo system error signal generation comprises the steps of synchronous rectification of the total feedback signal followed by integration thereof with respect to time to accumulate the absolute magnitude of the resistive voltage signal component, whereby undesirable inductive voltage signal components are eliminated. An illustrated embodiment of a preferred error correction signal generator circuit of this invention comprises an input transformer having a primary for connection in parallel with a workpiece resistance and a center-tapped secondary, a double-pole double-throw switch having an output terminal and two input terminals connected with opposite ends of the transformer secondary, and an integrater coupled with the output terminal of the switch.

While this invention is particularly pointed out and distinctly claimed in the claims appended to the specification, a better understanding thereof, together with additional objects and advantages will be had upon consideration of the following description and the accompanying drawing, wherein:

Figure 1:
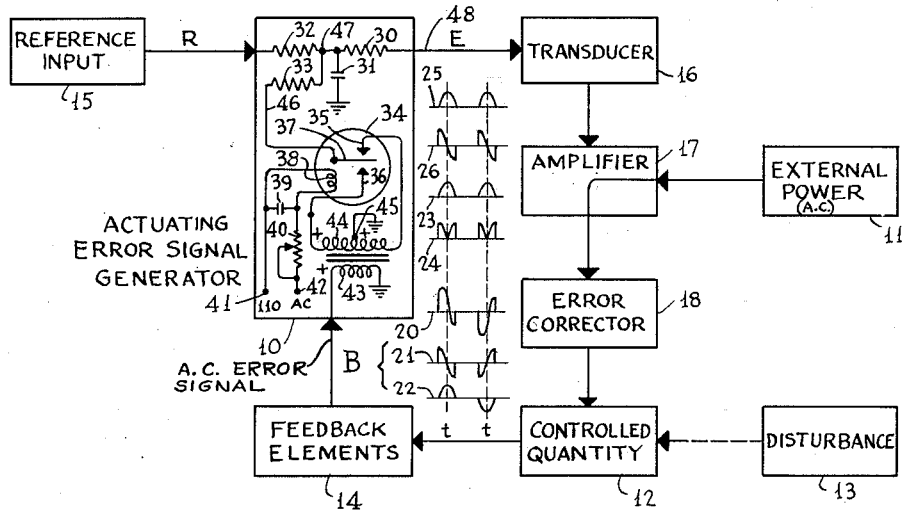
FIG. 1 is a block diagram illustrating, schematically, the servo system signal generation methods and circuits of this invention in conjuction of a generalized closed-loop system.

With particular reference to FIG. 1, the error correction signal generator 10 of this invention is illustrated in operational relationship with functional elements of a generalized servo system. This system is required to control the delivery of energy from an alternating power source 11 so as to maintain a predetermined level or condition of the controlled quantity at 12, regardless of disturbing influences from independent sources indicated at 13. Condition of the controlled quantity at 12 is sensed by feedback elements 14 which generate a feedback signal B. The reference signal generator 15 generates a reference signal R according to an extrinsic command. The level of reference signal R is selected to equal the level of the feedback signal B when the latter corresponds to the desired condition of the controlled quantity at 12.

The error correction signal generator 10 sets up a comparison (R—B) and generates an error correction signal E according to any difference in the comparison. Transducer 16 harmonizes the error correction signal E with the input parameters of amplifier 17. The latter responds to alter the power input delivered to error corrector 18 which acts on the controlled quantity at 12.

When power is developed by an alternating current power source and a resistive condition of the controlled quantity is monitored, as here, the feedback signal B is a composite signal, diagrammed at 20, comprising an inductive voltage component 21 and a resistive voltage component 22. It is the resistive voltage component 22 which is informative of the resistive parameter of the controlled quanity at 12. Each of these voltage wave forms exhibits the characteristic discontinuous, alternate polarity, segments which correspond in time to the portions of the alternate half cycles of the power source when current is traversing the controlled quantity.

Heretofore, the composite signal 20 was sampled at time *t* coincidence with the inductive voltage inflections when the resistive voltage component 22, only, is present in the total feedback signal B. According to this invention, however, the difficult sampling procedure is avoided by a unique step designated as synchronous rectification. By way of explanation, conventional rectification of the feedback signal would result in the signal component forms indicated at 23 for the resistive voltage component and at 24 for the inductive voltage component, without deletion from the composite signal of any of the inductive voltage effects. By synchronous rectification, alternate half cycles of the feedback signal are inverted in sign with the result that the resistive signal component indicated at 25 is equivalent to the rectified wave form at 23 but, because of the polarity reversals, the inductive voltage component appears in the form indicated at 26. Consequent integration with respect to time of the resistive component 25 yields an integral value proportional to the absolute magnitude of that component while integration over each half cycle of the inductive voltage component 26 yields an integral value identically equal to zero. Therefore, an error correcting signal, E, generated upon integration of the synchronously rectified composite feedback signal will be free of the undesirable inductive voltage effects during the intervals between power inputs to the controlled quantity. The latter intervals are the time periods when error correction information is usable by conventional alternating current power controllers. Pursuant to the error correction signal information, the fractional conduction period for each successive half cycle of the power source can be increased or decreased as required to correct for the indicated error.

A simplified, inexpensive and effective circuit 10 for error correction signal generation according to this invention comprises the RC integrator network of resistor 30 and capacitor 31, the summing network of resistors 32 and 33, and the synchronous rectifier circuit of vibrator 34. The vibrator, or inverter, 34 is essentially a double-pole double-throw switch having two input electrodes 35 and 36 arranged at opposite sides of a vane 37 moved from contact with terminal 35 to contact with terminal 36 by an electromagnet 38 against a spring bias. The electromagnet is energized through the phase control circuit of capacitor 39 and variable resistor 40, connected at terminals 41, 42 to an alternating current supply synchronized with the external power source 11. After suitable adjustment of the variable resistor 40, the vane 37 will contact input electrode 35 during transmission of the first half cycles by the external power source and contact input electrode 36 during second half cycles.

The feedback signal input is to the primary 43 of an input transformer having a center-tapped secondary 44. Opposite ends of the secondary 44 are coupled respectively with electrodes 35 and 36 of switch 34. The center tap 45 may be connected to a reference potential source or to ground as shown.

A positive pulse input to primary 43 will result in the appearance of an equivalent positive pulse at electrode 36 and, simultaneously, of a negative pulse at electrode 35; the converse will occur for a negative pulse input to primary 43. Therefore, when vane 37 is in contact with electrode 36 the switch output on conductor 46 will have the same polarity as the input to primary 43 and when the vane 37 is in contact with the electrode 35 the output on conductor 46 will have the polarity opposite to that of the input to primary 43. When a feedback signal having the form shown at 20 is the input to primary 43 the output on conductor 46 will comprise the components indicated at 25 and 26. Formation of an error correction signal is completed by comparison of the synchronously rectified feedback signal with a reference signal followed by integration of the comparison result.

The comparison is achieved by means of the summing network of resistors 32, 33 connected at common output terminal 47. When the resistive component 25 of the synchronously rectified feedback signal input to resistor 33 from conductor 46 is a series of positive going pulses, the reference signal R input to resistor 32 is chosen as a negative voltage so that the output at terminal 47 (the input to RC integrator 30, 31) is directly proportional to any difference in the comparison. The comparison value (the difference signal voltage at terminal 47) is thereafter continuously integrated by the RC network 30, 31 resulting in a voltage signal on output conductor 48 equivalent to the time integral of the absolute magnitude of error between the reference signal voltage (input to resistor 32) and the resistive voltage component of the feedback signal (input to resistor 33) during utilization periods. This latter voltage wave form (on conductor 48) is the error correction signal indicating, by its magnitude and sign, the correction to be made effective in the controlled quantity 12 in order to equate its actual condition to the desired condition.

Figure 2:
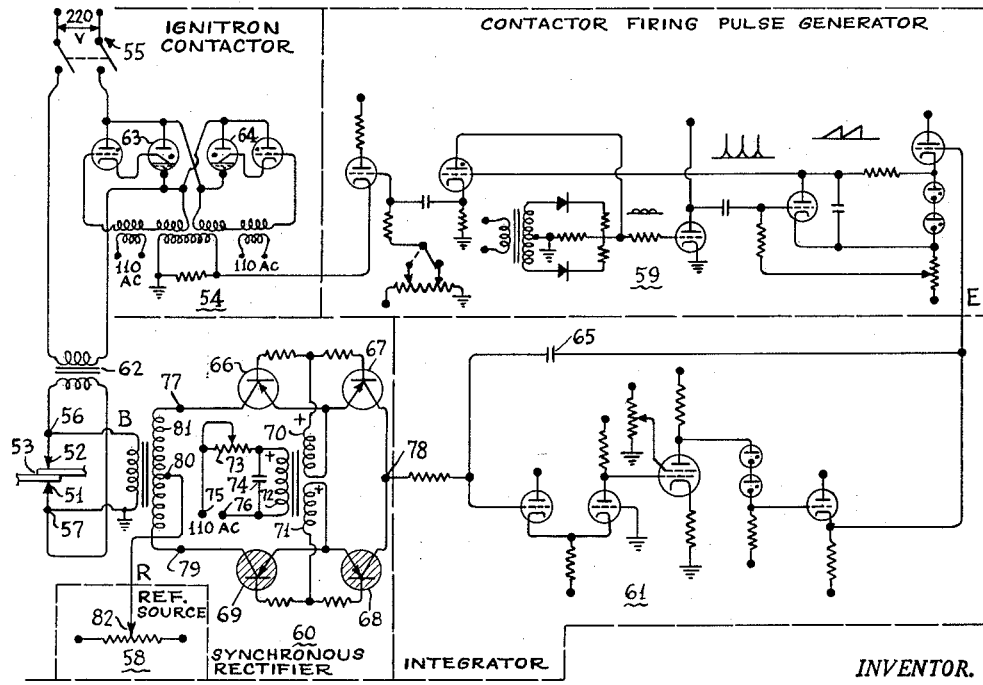
FIG. 2 illustrates a preferred servo system signal generator circuit as applied in a resistance heating control.

FIGURE 2 illustrates a preferred embodiment of this invention in a circuit for the control of resistance welding operations on thin sheet metal workpieces. The functional elements correspond generally to those of FIGURE 1. A conventional welding machine is illustrated schematically by welding electrodes 51 and 52 in contact with a composite workpiece 53. Here, the controlled quantity is the series resistance across workpiece 53 between electrodes 51 and 52. This quantity may be related to an equilibrium workpiece temperature condition as explained in the copending application, Serial No. 756,397, referred to above.

The welding machine acts as an error corrector, ignitron contactor 54 acts as an amplifier, and an external power source is represented by the alternating current mains connected to switch 55. Potential pick-off connections 56, 57 to opposed electrodes 51, 52 represent the feedback elements of FIG. 1. A reference input element is again illustrated as a potentiometer 58, and an ignitron firing pulse generator 59 serves as transducer for error correction signals. Circuits according to this invention are embodied in the actuating error signal generator combination of a synchronous rectifier 60 and an integrator 61.

As the details of some of these servo system elements, excepting synchronous rectifier 60 and its combination with integrator 61, are fully explained in the above-mentioned copending application, it should be sufficient here to point out only their functions, as follows. Contactor 54 passes current through welding transformer 62 during the portion of each half cycle of the alternating current power source remaining after the operative ignitron 63 or 64 has been fired. Firing pulse generator 59 generates igniting pulses for the contactor ignitrons at more or less of a phase lag with respect to alternations of the source voltage as a function of the level of a D.C. voltage signal from the actuating error signal generator circuits 60 and 61. The power input to the workpiece 53 is, of course, a function of the lengths of the alternating current pulses transmitted through contactor 54 and welding transformer 62.

Conventional alternating current contactors such as the ignitron contactor 54 are unaffected by control signal values during conduction periods for either ignitron 63, or 64. Once started, conduction by an ignitron is terminable only upon abatement of its anode voltage. Consequently, it is not necessary to suppress control signal disturbances, such as the inductive voltage effects referred to previously, during ignitron conduction periods. The inductive voltage excursions are due to current variations and are concurrent with conduction periods of the contactor ignitrons. Each cycle of an inductive voltage excursion exhibits positive and negative portions of equal area when graphed with respect to time and, therefore, the integral with respect to time over each inductive voltage excursion cycle must be zero valued. It will be apparent then that the integral error correction signals generated according to this invention have no component related to inductive voltage effects during the periods when a conventional ignitron contactor action is controllable.

In the preferred actuating error signal generator combination, the synchronous rectifier 60 comprises a transistorized equivalent of the double-pole, double-throw switch (alternator 34) of FIG. 1 and a conventional operational amplifier 61, with a capacitor 65 connected between its input and output terminals, is substituted for the simple RC integrator.

The synchronous rectifier 60 is unique in that double-pole, double-throw switching is provided for by p-n-p transistor pairs 66—67 and 68—69. The transistors of each pair have a common base and a common emitter circuit and one of two similar biasing transformer secondaries 70, 71 is connected therebetween. Transformer secondaries 70, 71 are wound so that induced secondary voltages are 180° out of phase with each other. A common primary 72 for the secondaries 70, 71 is coupled through a phase shift network comprising resistor 73 and capacitor 74 to an alternating current source at terminals 75, 76. The phase shift network is adjusted to synchronize the voltage wave form impressed upon primary 72 with the voltage wave form impressed upon workpiece 53.

During the half cycle when the primary 72 is polarized as indicated, the common base circuit of transistor pair 66—67 is biased positively with respect to the common emitter circuit of that pair, the transistors 66—67 are non-conducting, and there is, in effect, an open circuit between input terminal 77 and output terminal 78. Simultaneously, the converse forward bias condition exists for transistors 68—69 for which conduction is indicated by the shade lines, and there is, in effect, a closed circuit between input terminal 79 and the output terminal 78. During the succeeding half cycle of the input to primary 72 the above conditions are reversed—terminals 77 and 78 are coupled for signal transmission therebetween and terminals 79 and 78 are decoupled.

While this transistorized switch is the functional equivalent of the vibrator of FIG. 1, it is preferred because of decreased transfer time (less than 100 microsecond as compared with about 500 microsecond for the vibrator) and also because it is significantly less expensive.

An alternative system position for the reference signal generator 58 is illustrated in the FIGURE 2 embodiment. The reference input is to the mid-tap 80 of input transformer secondary 81. This position for the reference signal input obviates a summing network for comparison of the reference and feedback signals. The polarity of the reference voltage is chosen opposite to the polarity of the synchronously rectified resistive voltage component of the feedback signal. Selection of the reference signal voltage is readily accomplished by means of the manually adjustable tap 82 on the potentiometer 58.

Various substitutions and modifications in the circuits and method steps of this invention will be apparent to those skilled in the art and it should be noted, therefore, that this invention is not to be restricted by the illustration and explanation of specific embodiments.

What is claimed is:

1. The method of servo system error signal generation comprising the steps of synchronously rectifying a cyclic feedback signal by inverting alternate half cycles only of the feedback signal to produce a synchronously rectified feedback signal including rectified and unrectified half cycles of the feedback signal, and integrating the synchronously rectified feedback signal with respect to time.

2. The method of generating servo system error correction signals corresponding to any difference between the condition of a controlled quantity as indicated by the resistive voltage component of a discontinuous alternating composite resistive voltage and inductive voltage feedback signal and a desired condition for that quantity indicated by a reference voltage signal, which method comprises the steps of synchronously rectifying the feedback signal by inverting alternate half cycles only of the feedback signal to produce a synchronously rectified feedback signal including rectified and unrectified half cycles of the feedback signal, integrating the synchronously rectified feedback signal with respect to time, and reducing the absolute magnitude of the integral signal by the absolute magnitude of the reference signal to produce the error correction signal.

3. The method of generating servo system error correction signals corresponding to any difference between the condition of a controlled quantity as indicated by the resistive voltage component of a discontinuous alternating composite resistive and inductive voltage feedback signal and a desired condition for that quantity indicated by a reference voltage signal, which method comprises the steps of synchronously rectifying the feedback signal by inverting alternate half cycles only of the feedback signal to produce a synchronously rectified feedback signal including rectified and unrectified half cycles of the feedback signal, subtracting from the absolute magnitude of the feedback voltage signal the absolute magnitude of the reference voltage signal, and integrating the resultant with respect to time to provide the error correcting signal.

4. The method of generating error correction signals for a servo system of the type in which a discontinuous alternating current input to a controlled quantity alters the condition of that quantity according to the fraction of successive half cycles of the source voltage during which current is conducted through the controlled quantity and the condition of the controlled quantity is indicated by the resistive voltage component of a composite resistive and inductive voltage feedback signal and a desired condition for the quantity is indicated by a reference voltage signal, which method comprises the steps of synchronously rectifying the feedback signal by inverting alternate half cycles only of the feedback signal to produce a synchronously rectified feedback signal including rectified and unrectified half cycles of the feedback signal, integrating with respect to time the synchronously rectified feedback signal, and reducing the resistive voltage component of the feedback signal by the absolute magnitude of the reference voltage signal, whereby the resultant error correction signal is free from undesirable voltage effects during the intervals between power inputs to the controlled quantity when error correction information is usable by conventional alternating current power controllers to alter the fractional conduction period for succeeding half cycles of the source.

5. The servo system signal generation method primarily for use in the control of alternating current resistance heating operations of the type in which a succession of variable duration current pulses of alternating signs are conducted through a workpiece position, which method comprises the steps of generating a first signal proportional to the voltage developed across the resistance of the workpiece position by the current pulses, generating a second signal comprising alternate rectified and unrectified half cycles of the first signal by synchronously rectifying the first signal, and generating a third signal by integrating the second signal with respect to time whereby the third signal is indicative of the resistive voltage component and substantially independent of the inductive voltage component of the first signal.

6. The method of claim 5 including the step of generating a reference voltage signal proportional to a heating effect to be generated at the workpiece position and the step of reducing the absolute magnitude of the third signal by the absolute magnitude of the reference signal to produce an error signal which is substantially independent of inductive voltage effects.

(References on following page)

References Cited in the file of this patent

UNITED STATES PATENTS

| | | |
|---|---|---|
| 2,429,636 | McCoy | Oct. 28, 1947 |
| 2,508,330 | Callender | May 16, 1950 |
| 2,767,361 | Blomqvist et al. | Oct. 16, 1956 |
| 2,767,364 | Guggi | Oct. 16, 1956 |
| 2,829,251 | Patton | Apr. 1, 1958 |
| 2,848,595 | Van Sciver | Aug. 19, 1958 |
| 2,871,349 | Shapiro | Jan. 27, 1959 |
| 2,937,342 | Wellman | Dec. 28, 1960 |
| 2,982,867 | Wennerberg | May 2, 1961 |

FOREIGN PATENTS

| | | |
|---|---|---|
| 1,158,918 | France | June 21, 1958 |

OTHER REFERENCES

Ritow: "Fundamentals of Servomechanisms," Electrical Manufacturing magazine, Feb. 1956, pp. 98 and 99.